No. 777,517. PATENTED DEC. 13, 1904.
G. W. KELLOGG.
PRESSURE REGISTER.
APPLICATION FILED APR. 9, 1904.
NO MODEL.
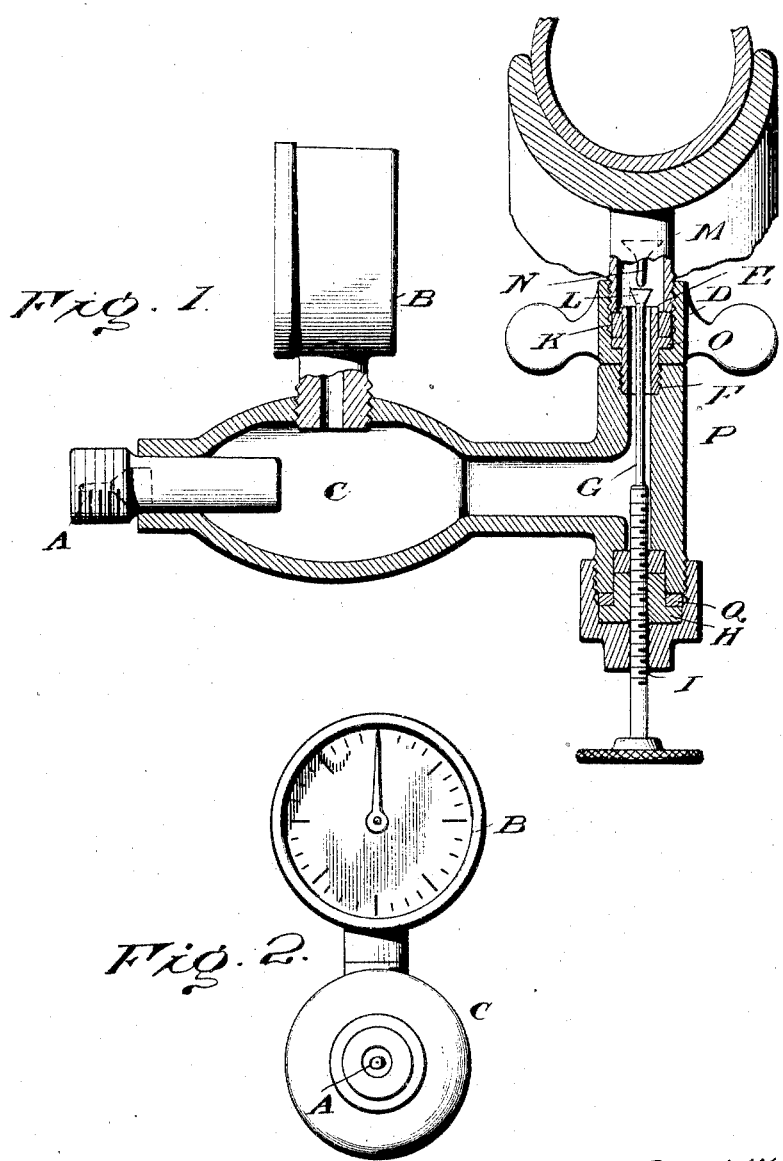

No. 777,517. Patented December 13, 1904.

UNITED STATES PATENT OFFICE.

GEORGE W. KELLOGG, OF ROCHESTER, NEW YORK.

PRESSURE-REGISTER.

SPECIFICATION forming part of Letters Patent No. 777,517, dated December 13, 1904.

Application filed April 9, 1904. Serial No. 202,467. (No model.)

*To all whom it may concern:*

Be it known that I, GEORGE W. KELLOGG, a resident of Rochester, in the county of Monroe and State of New York, have invented certain new and useful Improvements in Pressure-Registers; and I do hereby declare the following to be a full, clear, and exact description of the invention, such as will enable others skilled in the art to which it pertains to make and use the same.

The invention relates to means for connecting a pressure-register to a tire or other receptacle, and has for its object to indicate the degree of pressure in pneumatic tire and other like receptacles holding a fluid under pressure.

The invention consists in the construction hereinafter described and pointed out.

In the accompanying drawings, which form a part of this specification, Figure 1 is a central section of the improved device, and Fig. 2 is an end elevation.

A denotes a standard tire-valve, and B a pressure-gage. The valve is adapted to close by interior pressure a passage or opening communicating with the interior of a hollow body C, with which the interior of the pressure-gage is also in free communication. The particular exterior or interior dimensions and form of the chambered or hollow body C are not material.

M indicates a standard-tire-valve nipple, and N a valve, and D an interiorly-threaded thumb nut or coupling adapted to be screwed upon the nipple.

E denotes a tubular post provided with a collar O and with a left-hand screw-thread at F, whereby it is screwed into a suitable opening in a tubular arm P, communicating with the interior of the body C. Said post E has a kerf to receive a screw-driver, and being arranged and the parts assembled as shown holds the coupling to the arm in manner permitting the said nut D to swivel on the post.

K indicates a packing of leather or suitable material to prevent escape of air or other fluid when the receptacle is charged with the fluid, as will be described.

G denotes a stem or pin having at I a screw-thread connection with a stuffing-box, and H is a stuffing-box collar, packing being denoted by Q. The pin G has preferably an enlarged end L and is adapted to be screwed against a tire-valve, for example, to hold it open against pressure.

In practice the tubular post E, situated in the nut D, is screwed into the arm P of the body, which may be done when the parts are assembled at the factory. The coupling is subsequently screwed on the valve-nipple to connect the device with a tire or other receptacle. The parts being connected, the screw-pin is manipulated to open the valve N, whereupon the pressure in the tire or other receptacle is indicated by the gage. In case recharging is required it is effected in the usual way by means of the inlet closed by valve A. The device is detached from the nipple M by suitably manipulating the thumb-nut coupling D, the pin G being first withdrawn to allow valve N to close.

The device may be constructed for use in connection with a pressure-gage, tire, and air-pump, such as in common use, or it may be mechanically modified for use in other relations without departure from the invention.

Having thus described my invention, what I claim as new, and desire to secure by Letters Patent, is—

1. The chambered body provided with a valved inlet and with a pressure-gage, means for coupling the body to a valve-inlet nipple of a pneumatic tire or the like, whereby the tire can be charged with a fluid under pressure, and means to open communication between the tire and the body.

2. The combination of the chambered body, the pressure-gage, the coupling adapted to be screwed on a nipple, a tubular post for connecting the coupling and body, and an adjustable pin or stem passing through the post.

3. The combination of the chambered body, the pressure-gage, a valve-inlet nipple, the coupling adapted to be screwed on the nipple, a tubular post for connecting the coupling and body, an adjustable pin and stem passing through the post, and a valve in the nipple situated in the path of the stem.

4. The chambered body provided with a pressure-gage, means for coupling the body to an inlet-valve nipple of a pneumatic tire or the like, and means to open communication between the tire and body, whereby the interior pressure of the tire may be registered by the gage.

5. A chambered body provided with an inlet having an automatically-operative check-valve and with a pressure-gage, and an independently-operative device for coupling the body to an inlet-nipple of a pneumatic tire or the like, whereby the tire can be charged with a fluid under pressure, said pressure being registered by the gage.

6. The combination of the chambered body, the swivel-coupling adapted to be screwed on a nipple and a tubular post having a screw-thread connection with the body and provided with a collar for loosely connecting the coupling and body.

In testimony whereof I have signed this specification in the presence of two subscribing witnesses.

GEORGE W. KELLOGG.

Witnesses:
MORTIMER E. HILE,
GEO. P. CULP.